US007064151B1

(12) United States Patent
Berge et al.

(10) Patent No.: US 7,064,151 B1
(45) Date of Patent: Jun. 20, 2006

(54) PROCESS OF MICROGEL SYNTHESIS AND PRODUCTS PRODUCED THEREFROM

(75) Inventors: Charles T. Berge, Wilmington, DE (US); John Chiefari, Armdale (AU); Jeffery W. Johnson, Rochester Hills, MI (US); Albert Mau, Wheelers Hill (AU); Roshan Mayadunne, Wheelers Hill (AU); Catherine Louise Moad, Sassafras (AU); Graeme Moad, Sassafras (AU); Ezio Rizzardo, Wheelers Hill (AU); Gerry Swiegers, Wheelers Hill (AU); San Thang, Clayton South (AU); Gerry Wilson, Collingwood (AU)

(73) Assignees: E. I. du Pont de Nemours and Company, Wilmington, DE (US); Commonwealth Scientific and Industrial Research Organisation, Victoria (AU)

( * ) Notice: Subject to any disclaimer, the term of this patent is extended or adjusted under 35 U.S.C. 154(b) by 496 days.

(21) Appl. No.: 10/257,991

(22) PCT Filed: Apr. 6, 2001

(86) PCT No.: PCT/US01/11386

§ 371 (c)(1),
(2), (4) Date: Oct. 2, 2002

(87) PCT Pub. No.: WO01/77198

PCT Pub. Date: Oct. 18, 2001

(30) Foreign Application Priority Data

Apr. 7, 2000 (AU) .................................. PQ6794

(51) Int. Cl.
*C08J 9/00* (2006.01)
*C08L 33/08* (2006.01)
*C08K 3/20* (2006.01)

(52) U.S. Cl. ...................... 521/142; 525/123; 524/591
(58) Field of Classification Search ................ 521/142; 525/123; 524/591
See application file for complete search history.

(56) References Cited

U.S. PATENT DOCUMENTS

| 5,078,994 | A | 1/1992 | Nair et al. |
| 5,264,530 | A | 11/1993 | Darmon et al. |
| 5,429,826 | A | 7/1995 | Nair et al. |
| 5,830,966 | A | 11/1998 | Thang et al. |

FOREIGN PATENT DOCUMENTS

| WO | WO 95/04026 A1 | 2/1995 |
| WO | WO 96/15157 | * 5/1996 |
| WO | WO 96/15157 A1 | 5/1996 |
| WO | WO 97/49387 A1 | 12/1997 |
| WO | WO 98/01478 | * 1/1998 |
| WO | WO 98/01478 A1 | 1/1998 |
| WO | WO 98/31739 A1 | 7/1998 |
| WO | WO 99/05099 A1 | 2/1999 |
| WO | WO 99/31144 | * 6/1999 |
| WO | WO 99/31144 A1 | 6/1999 |
| WO | WO 00/02939 A1 | 1/2000 |

OTHER PUBLICATIONS

Weiner et al, Uses and Abuses of Photon Correlation Spectroscopy in Particle Sizing, American Chemical Society, 1987, Chapter 3, pp. 48-61.
Blatt et al., Aus. J. Chem. 1987, Luminescence Probe Studies of Pyrene and Two Charged Derivatives in Nafion* vol. 40, pp. 1-12.
Greenley, R.Z. in Polymer Handbook 3rd Edition, 1989 p. II/53, publisher-John Wiley & Sons, New York, New York.
E. Grulke, Solubility Parameter Values, Polymer Handbook, 3rd Edition, 1989, VII/675-677, publisher-John Wiley & Sons, New York, New York.
Allan F. M. Barton, Handbook of Polymer-Liquid Interaction Parameters and Solubility Parameters by, 1990 edition (publisher-CRC Press, Boca Raton, Florida).
Zhao et al., Fluorescence Probe Techniques Used To Study Micelle Formation in water-soluble Block Copolymers, Languor, 1990, vol. 6, pp. 514-516.
Moad et al., The Chemistry of Free Radical Polymerization, Pergamon, London, 1995, pp. 53-95.
Moad et al. The Chemistry of Free Radical Polymerization, Pergamon, London, 1995, pp. 162-171.
Moad et al., The Chemistry of Free Radical Polymerization, Pergamon, London, 1995, pp. 171-186.
Rizzardo et al., Control of Polymer Structure by Chain Transfer Processes, Macromol. Symp. 1996, vol. 111, pp. 1-11.
Saito R et al., Synthesis of Poly (vinyl alcohol) Core-Polystyrene Shell-type Flower Microgels, Journal of Applied Polymer Science, 1997, vol. 63, pp. 849-854.
Armes et al., Synthesis of Zwitterionic Shell Cross-Linked Micelles, J. Am. Chem. Soc., 1999, vol. 121, pp. 4288-4289.
Copy of the International Search Report or the Declaration, PCT/US 01/11386, Jul. 3, 2001.

* cited by examiner

Primary Examiner—Robert D. Harlan

(57) ABSTRACT

The invention provides in one aspect a process for preparing a microgel by RAFT polymerizing in the presence of a RAFT chain transfer agent, one or more solvophobic monomers and one or more solvophilic monomers to form one or more block copolymers comprising one or more solvophobic blocks and one or more solvophilic blocks wherein the solvophobic block is insoluble in a dispersing medium and the solvophilic block is soluble in the dispersing medium. The block copolymer is dispersed in the dispersing medium to form micelles, which is then stabilized to form the microgel. The dispersing medium can be aqueous or lipophilic. The method of the present invention also permits one to encapsulate a wide variety of materials, such as pigments, dye molecules, and aluminum flakes used in metallized paints.

50 Claims, No Drawings

PROCESS OF MICROGEL SYNTHESIS AND PRODUCTS PRODUCED THEREFROM

TECHNICAL FIELD

This invention concerns a process for the preparation of microgels or crosslinked micelles and the encapsulation of reagents within said micelles, microgels produced from the process and products containing such microgels.

BACKGROUND OF THE INVENTION

Microgels that are sub-micron in size are also known as nanospheres.

The properties of microgels make them particularly useful in a wide range of applications, such as in additives, in advanced material formulations for foams or fibers, in binders and re-dispersible latexes.

Diblock (A-B) and triblock (A-B-A) copolymers typically form micelles in solvents where one component of the block is soluble (miscible) and the other less soluble or insoluble (immiscible). Many such examples are known, such as a block copolymer having a solvophobic block of polystyrene and a hydrophilic block of poly(ethylene oxide) which forms micelles in alcoholic solvents. The solvophilic-solvophobic balance affects the propensity of the block copolymer to form micelles. Micellization can sometimes be achieved by first dissolving the block copolymer in a mutual solvent, and then dispersing this solution in a non-solvent for one of the blocks or by changing the ratio of solvent to non-solvent. The size of the resulting micelles depends on the molecular weights of the component blocks and the nature of the solvent.

Micelles are dynamic systems that equilibrate between a micellic and non-micellic form of a block copolymer. In order to "stabilize" a polymeric micelle, it is necessary to chemically modify the formed micelles, stabilizing them into the desired configuration, typically using crosslinking reactions. The micelles can be stabilized either by crosslinking of the core or the shell. Care is required in preparing microgels as the reactive groups present within these systems can undergo intermolecular reactions, which can lead to intractable networks.

Core crosslinked micelles based on block copolymers are disclosed by Nair and Yoo in U.S. Pat. No. 5,429,826. A variety of shell crosslinked micelles based on block copolymers are disclosed by Wooley et al. in WO97/49387, the disclosures of which are incorporated herein by reference. The block copolymers used in these disclosures were synthesized by anionic or group transfer polymerization. These procedures suffer from a number of disadvantages. These procedures are expensive to implement. They are also compatible with only a narrow range of monomers. Protic monomers (e.g. methacrylic acid) must be protected in order for these techniques to be used and then deprotected before micellization. Anionic and group transfer polymerization cannot be generally applied to make copolymer blocks. These considerations have severely limited the range of block copolymers that have been used for the production of micelles.

Crosslinked micelles have also been prepared from block copolymers synthesized by radical polymerization using dithiocarbamate photoiniferters as described by Saito et al. (*J. Appl. Polym, Sci.,* 1997, 63,849) or by using atom transfer polymerization as disclosed by Armes in *J. Am. Chem. Soc.* 1999, 121, 4288. These methods for block copolymer synthesis also suffer from the very narrow range of monomers to which they are applicable.

Recently new methods of block copolymer synthesis by radical polymerization based on the use of chain transfer agents, which react, by reversible addition-fragmentation chain transfer (RAFT) have been described in WO 98/01478. These reagents provide an economical route to block copolymers derived from a diverse range of monomers. The preferred chain transfer agents for use in these methods include thiocarbonylthio compounds (dithioesters, trithiocarbonates, xanthates and dithiocarbamates) and certain macromonomers. A particular advantage is that acid-containing monomers can be polymerized without the need for protection-deprotection strategies. Reactive functionalities allowing crosslinking may also be incorporated.

The present invention now recognizes that block copolymers produced by RAFT polymerization may be advantageously used in the production of micellar structures avoiding some of the problems associated with prior art processes for forming crosslinked micelles.

The present invention also recognizes that it is useful to encapsulate third party molecules or particles with the particles resulting from the stabilization of the micelles, and also such stabilized micelles, which are microgels, may be post-preparatively modified by chain extending of the arms.

The virtue of the process of this invention is that a much wider range of functionality, for example for crosslinking, for controlling the surface functionality and for determining the microenvironment in the core of the micelle, is possible.

STATEMENT OF THE INVENTION

According to one aspect of the present invention, there is provided a process for preparing a microgel comprising:

(i) RAFT polymerizing in the presence of a RAFT chain transfer agent, one or more solvophobic monomers and one or more solvophilic monomers to form one or more block copolymers comprising one or more solvophobic blocks and one or more solvophilic blocks wherein said solvophobic block is insoluble in a dispersing medium and said solvophilic block is soluble in said dispersing medium;

(ii) dispersing said block copolymer in said dispersing medium to form micelles; and (iii) stabilizing said micelles to form said microgel.

The present invention is also directed to a microgel containing one or more of the following functionalities:

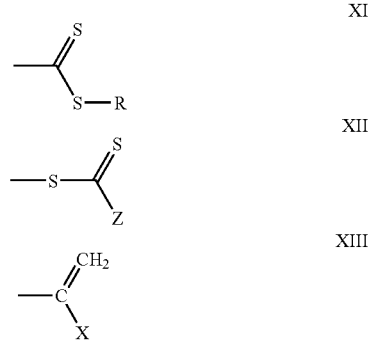

-continued

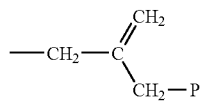

XIV wherein R and P are free radical leaving groups; and wherein,

R is selected from the group consisting of unsubstituted or substituted $C_1$ to $C_{18}$ alkyl, unsubstituted or substituted alkenyl, unsubstituted or substituted alkynyl, unsubstituted or substituted saturated carbocyclic ring, unsubstituted or substituted unsaturated carbocyclic ring, unsubstituted or substituted aromatic carbocyclic ring, unsubstituted or substituted saturated heterocyclic ring, unsubstituted or substituted unsaturated heterocyclic ring, unsubstituted or substituted aromatic heterocyclic ring, unsubstituted or substituted alkylthio group, and a first polymer chain having a number average degree of polymerization in the range of 5 to 1000;

Z is selected from the group consisting of hydrogen, chlorine, unsubstituted or substituted $C_1$ to $C_{18}$ alkyl, unsubstituted or substituted aryl, unsubstituted or substituted $C_3$ to $C_{18}$ heterocyclic ring, unsubstituted or substituted $C_1$ to $C_{18}$ alkylthio, SR, unsubstituted or substituted arylthio, unsubstituted or substituted $C_1$ to $C_{18}$ alkoxy, unsubstituted or substituted aryloxy, unsubstituted or substituted amino, unsubstituted or substituted $C_1$ to $C_{18}$ alkoxycarbonyl, unsubstituted or substituted aryloxycarbonyl, carboxy, unsubstituted or substituted $C_1$ to $C_{18}$ acyloxy, unsubstituted or substituted aroyloxy, unsubstituted or substituted carbamoyl, cyano, $C_2$ to $C_{18}$ dialkyl-phosphonato, diaryl-phosphonato, $C_1$ to $C_{18}$ dialkyl-phosphinato, diaryl-phosphinato and a second polymer chain having a number average degree of polymerization in the range of 5 to 1000;

P is an oligomer or polymer having a number average degree of polymerization in the range of 2 to 1000 or said first polymer chain;

X is selected from the group consisting of unsubstituted or substituted aryl, $C_1$ to $C_{18}$ alkoxycarbonyl, unsubstituted or substituted aryloxycarboyl, carboxy, unsubstituted or substituted aryloxycarbonyl, $C_1$ to $C_{18}$ carboxy, and cyano; and wherein the substituents for the substituted groups for R, Z and X are independently selected from the group consisting of hydroxy, tertiary amino, halogen, cyano, epoxy, carboxylic acid, alkoxy, alkyl having 1 to 32 carbon atoms, aryl, alkenyl having 2 to 32 carbon atoms, alkynyl having from 2 to 32 carbon atoms, saturated carbocyclic rings having 3 to 14 carbon atoms, unsaturated carbocyclic rings having 4 to 14 carbon atoms, aromatic carbocyclic rings having 6 to 14 carbon atoms, saturated heterocyclic rings having 3 to 14 carbon atoms, unsaturated heterocyclic rings having 3 to 14 carbon atoms and aromatic carbocyclic rings having 6 to 14 carbon atoms.

According to yet another aspect of the present invention, there is provided the microgels formed by the present invention in its various aspects.

According to a further aspect of the present invention, there is provided a process for encapsulation of a material within a microgel which comprises adding a partially solubilized suspension of said material to a dispersion of the block copolymers described above, either before or after micellization thereof, and stabilizing the micelles to form microgels encapsulating said material.

DETAILED DESCRIPTION OF THE INVENTION

As defined herein:

The term "block copolymer" refers to a structure of the formula $[A(B)_a]_b$ where a and b are integers and A and B are homopolymers or statistical copolymers, or themselves, may be block copolymers.

The term "RAFT polymerization" refers to a method of block copolymer synthesis by radical polymerization using chain transfer agents which react by reversible addition—fragmentation chain transfer.

The term "micellar structure" refers to any self-assembled multiphase particulate structure.

The term "initiating radicals" refers to radicals formed from a free radical source from which radical species add monomer units to form propagating radicals.

The term "propagating radicals" refers to radical species that have added one or more monomer units and are capable of adding further monomer units.

The term "stabilize" or any form of that word refers to modification of the formed micelles to set them into a desired configuration, and includes chemically modifying the micelles by crosslinking and/or chain extension.

The term "degree of polymerization" of a block is the number of monomer repeat units in the block.

The term "polydispersity" of a polymer is the ratio of the weight average to the number average degree of polymerization.

The term "polymer particle size" means the diameter of the polymer particles measured using a Malvern Zetasizer 4 Particle Sizer supplied by Malvern Instruments Corporation, Malvern, Worcs, U.K. This instrument uses a 5 mW He—Ne laser operating at 633 nm to measure the size of the polymer particles by a quasi-elastic light scattering technique. The intensity of the scattering is a function of particle size. The technique is described in Chapter 3, pages 48–61, entitled Uses and Abuses of Photon Correlation Spectroscopy in Particle Sizing by Weiner et al. in 1987 edition of American Chemical Society Symposium series. To measure the particle diameter, ca. 2 mL of the sample solution was delivered into a quartz cell, which was placed in the instrument. The particle size in nanometers was then measured using the standard experimental settings. The measurement was repeated twice to ensure consistency. Distributions based on the relative number of particles of a particular size are reported. The particle size of the microgels can depend on the molecular weight of the block copolymer, their composition, their concentration, and the dispersing medium, which will be selected according to the intended use of the microgel. The particle size of the microgel of the present invention is preferably in the range 10 nm to 1000 nm, but can be larger, more preferably the particle diameter is in the range 20 nm to 100 nm. The microgel can contain two or more discrete phases caused by the phase separation of the block copolymer during the stabilizing step.

RAFT chain transfer agents suitable for use in the present invention are known. Some examples of such RAFT agents are disclosed in WO99/31144, which is incorporated herein by reference. Preferred chain transfer agents for use in forming the crosslinkable block copolymers used in the process of the present invention include thiocarbonylthio chain transfer agents of Formulae I–III, and macromonomers of Formula IV:

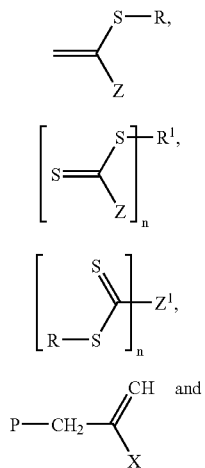

a combination thereof, wherein R, R¹ and P are free radical leaving groups; and wherein, R is selected from the group consisting of unsubstituted or substituted $C_1$ to $C_{18}$ alkyl, unsubstituted or substituted alkenyl, unsubstituted or substituted alkynyl, unsubstituted or substituted saturated carbocyclic ring, unsubstituted or substituted unsaturated carbocyclic ring, unsubstituted or substituted aromatic carbocyclic ring, unsubstituted or substituted saturated heterocyclic ring, unsubstituted or substituted unsaturated heterocyclic ring, unsubstituted or substituted aromatic heterocyclic ring, unsubstituted or substituted alkylthio group, and a first polymer chain having a number average degree of polymerization in the range of 5 to 1000;

Z is selected from the group consisting of hydrogen, chlorine, unsubstituted or substituted $C_1$ to $C_{18}$ alkyl, unsubstituted or substituted aryl, unsubstituted or substituted $C_3$ to $C_{18}$ heterocyclic ring, unsubstituted or substituted $C_1$ to $C_{18}$ alkylthio, SR, unsubstituted or substituted arylthio, unsubstituted or substituted $C_1$ to $C_{18}$ alkoxy, unsubstituted or substituted aryloxy, unsubstituted or substituted amino, unsubstituted or substituted $C_1$ to $C_{18}$ alkoxycarbonyl, unsubstituted or substituted aryloxycarbonyl, carboxy, unsubstituted or substituted $C_1$ to $C_{18}$ acyloxy, unsubstituted or substituted aroyloxy, unsubstituted or substituted carbamoyl, cyano, $C_2$ to $C_{18}$ dialkyl-phosphonato, diaryl-phosphonato, $C_1$ to $C_{18}$ dialkyl-phosphinato, diaryl-phosphinato and a second polymer chain having a number average degree of polymerization in the range of 5 to 1000;

R¹ is an n-valent moiety derived from R;

Z¹ is an m-valent moiety derived from a species selected from the group consisting of unsubstituted or substituted $C_1$ to $C_{18}$ alkyl, unsubstituted or substituted aryl and a third polymer chain having a number average degree of polymerization in the range of 5 to 1000 wherein the connecting moieties in said polymer chain are selected from the group consisting of $C_1$ to $C_{18}$ aliphatic carbon, aromatic carbon, oxygen, sulfur and a combination thereof;

P is an oligomer or polymer having a number average degree of polymerization in the range of 2 to 1000 or said first polymer chain;

X is selected from the group consisting of unsubstituted or substituted aryl, $C_1$ to $C_{18}$ alkoxycarbonyl, unsubstituted or substituted aryloxycarboyl, carboxy, unsubstituted or substituted aryloxycarbonyl, $C_1$ to $C_{18}$ carboxy, and cyano;

n and m are integers in the range of 1 to 6; and wherein the substituents for the substituted groups for R, R¹, Z, Z¹ and X are independently selected from the group consisting of hydroxy, tertiary amino, halogen, cyano, epoxy, carboxylic acid, alkoxy, alkyl having 1 to 32 carbon atoms, aryl, alkenyl having 2 to 32 carbon atoms, alkynyl having from 2 to 32 carbon atoms, saturated carbocyclic rings having 3 to 14 carbon atoms, unsaturated carbocyclic rings having 4 to 14 carbon atoms, aromatic carbocyclic rings having 6 to 14 carbon atoms, saturated heterocyclic rings having 3 to 14 carbon atoms, unsaturated heterocyclic rings having 3 to 14 carbon atoms and aromatic carbocyclic rings having 6 to 14 carbon atoms.

By a "polymer chain" referred to above for R, R¹, Z, Z¹ and P is meant conventional condensation polymers, such as polyesters [for example, polycaprolactone, poly(ethylene terephthalate), poly(lactic acid)], polycarbonates, poly(alkylene oxide)s [for example, poly(ethylene oxide), poly(tetramethylene oxide)], nylons, polyurethanes or chain polymers such as those formed by coordination polymerization (for example polyethylene, polypropylene), radical polymerization (for example, poly(meth)acrylates and polystyrenics, anionic polymerization (for example, polystyrene, polybutadiene), cationic polymerization (for example, polyisobutylene) and group transfer polymerization (for example, poly(meth)acrylates).

The groups R, R¹, Z and Z¹ are chosen so as to be appropriate for use with the desired monomers or monomer combination and the polymerization method as disclosed in International Patent Publications WO 98/01478, WO 99/05099 and WO 99/31144, all of which are incorporated herein by reference.

The synthesis of block copolymer by RAFT polymerization can be carried out in emulsion, solution or suspension in either a batch, semi-batch, continuous, or feed mode. For lowest polydispersity block copolymers, the RAFT agent is typically added before polymerization is commenced. For example, when carried out in a batch mode in solution, the reactor is typically charged with a RAFT agent and a monomer, or a polymerization medium plus the monomer. Block copolymers with broader, yet controlled, polydispersity or with multimodal molecular weight distribution can be produced by controlled addition of the RAFT agent over the course of the polymerization process.

In the case of emulsion or suspension polymerization, the polymerization medium will often be predominantly water and the conventional stabilizers, dispersants and other additives can be present.

For solution polymerization, the polymerization medium can be chosen from a wide range of media to suit the monomer(s) being used. For example, aromatic hydrocarbons, such as, petroleum naphtha or xylenes; ketones, such as, methyl amyl ketone, methyl isobutyl ketone, methyl ethyl ketone or acetone; esters, such as, butyl acetate or hexyl acetate; and glycol ether esters, such as, propylene glycol monomethyl ether acetate.

The use of feed polymerization conditions allows the use of RAFT agents with lower chain transfer constants and allows the synthesis of block copolymers that are not readily achieved using batch polymerization processes. If the RAFT polymerization is carried out as a feed system, the reaction can be carried out as follows:

The reactor is charged with the chosen polymerization medium, the RAFT agent and optionally a portion of the monomer mixture. Into a separate vessel is placed the remaining monomer mixture. The free radical initiator is dissolved or suspended in polymerization medium in another separate vessel. The medium in the reactor is heated and stirred while the monomer mixture plus the medium and the initiator plus the medium, is introduced, for example by a syringe pump or other pumping device. The rate and duration of feed is largely determined by the quantity of the solution, the desired monomer/RAFT agent/initiator ratio and the rate of the polymerization. When the feed is complete, heating may be continued for an additional period.

Following completion of the polymerization, the block copolymer can be isolated by stripping off the medium and unreacted monomer(s) or by precipitation with a non-solvent. Alternatively, the polymer solution/emulsion can be used as such, if appropriate to its application.

Block and multi-block and gradient copolymers may be prepared by varying the rate of monomer(s) addition and/or by varying the sequence in which the monomer(s) may be added to the polymerization medium. Gradient block may also be prepared in a one-step process by making use of the inherent difference in reactivity of the monomer(s). For gradient block copolymers, it is often desirable to pick comonomers with disparate reactivity ratios. For example, maleic anhydride and styrene or (meth)acrylates.

By appropriate selection of the groups R, $R^1$, Z, $Z^1$, P and X of the RAFT chain transfer agent of formulae I–IV above, block copolymers with specific end functionalities can be readily produced. Block copolymer may be prepared by starting with an existent polymer chain prepared by means other than RAFT polymerization and then modifying the end or other functionality such that the polymer chain is incorporated in a compound of formulae I–IV so as to create a macromolecular RAFT agent that can be chain extended by RAFT polymerization.

The "source of free radicals" or "initiator" suitable for use in the present invention includes those compounds that provide initiating radicals that add to monomers to produce propagating radicals.

The amount of initiator used depends upon the desired polydispersity, molecular weight and polymer structure of the resulting polymer. However, generally less than 10 weight percent based on the total amount of monomer mixture is used. Preferably the amount of initiator used is in the range of 0.001 to 5.0 wt. percent.

The source of initiating radicals includes such sources as the thermally induced homolytic scission of a suitable initiator, such as peroxides; peroxyesters, or azo compounds; the spontaneous generation from monomer, such as styrene; redox initiating systems; photochemical initiating systems or high energy radiation source, such as electron beam, X- or γ-radiation or a combination of these methods. The initiating system is chosen such that under the reaction conditions there is substantially no adverse interaction of the initiator or the initiating radicals with the RAFT agent under the reaction conditions. The initiator should also have the requisite solubility in the reaction medium or the monomer mixture.

Examples of suitable sources of free radicals for the process include azo compounds and peroxides such as:
2,2'-azobis(isobutyronitrile), 2,2'-azobis(2-cyano-2-butane), dimethyl 2,2'-azobis(methyl isobutyrate), 4,4'-azobis(4-cyanopentanoic acid), 4,4'-azobis(4-cyanopentan-1-ol), 1,1'-azobis(cyclohexanecarbonitrile), 2-(t-butylazo)-2-cyanopropane, 2,2'-azobis[2-methyl-N-(1,1)-bis(hydoxymethyl)-2-hydroxyethyl]propionamide, 2,2'-azobis[2-methyl-N-hydroxyethyl)]-propionamide, 2,2'-azobis(N,N'-dimethyleneisobutyramidine)dihydrochloride, 2,2'-azobis(2-amidinopropane)dihydrochloride, 2,2'-azobis(N,N'-dimethyleneisobutyramine), 2,2'-azobis(2-methyl-N-[1,1-bis(hydroxymethyl)-2-hydroxyethyl]propionamide), 2,2'-azobis(2-methyl-N-[1,1-bis(hydroxymethyl) ethyl] propionamide), 2,2'-azobis[2-methyl-N-(2-hydroxyethyl) propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, or dicumyl hyponitrite.

Photochemical initiator systems are chosen to have the requisite solubility in the reaction medium or monomer mixture and have an appropriate quantum yield for radical production under the conditions of the polymerization. Examples include benzoin derivatives, benzophenone, acyl phosphine oxides, and photo-redox systems. Free radicals may also be derived by direct photolysis of the compound of formula I–III.

Redox initiator systems are chosen to have the requisite solubility in the reaction medium or monomer mixture and have an appropriate rate of radical production under the conditions of the polymerization; these initiating systems can include combinations of the following oxidants and reductants:

Oxidants: potassium peroxydisulfate, hydrogen peroxide, and t-butyl hydroperoxide.

Reductants: iron (II), titanium (III), potassium thiosulfite, and potassium bisulfite.

Other suitable initiating systems are described in recent texts. See, for example, Moad and Solomon "The Chemistry of Free Radical Polymerization", Pergamon, London, 1995, pp 53–95.

A monomer mix suitable for use in the RAFT polymerisation process may include at least one vinyl monomer of the formula XI below:

where L is selected from the group consisting of hydrogen, halogen, and substituted or unsubstituted $C_1$-$C_4$ alkyl, substituents for the alkyl group being independently selected from the group consisting of OH, OR'', $CO_2H$, $O_2CR''$, $CO_2R''$ and a combination thereof; and where M is selected from the group consisting of hydrogen, R'', $CO_2H$, $CO_2R''$, COR'', CN, $CONH_2$, CONHR'', $CONR''_2$, $O_2CR''$, OR'', and halogen.

R'' is selected from the group consisting of substituted or unsubstituted alkyl, substituted or unsubstituted alkenyl, substituted or unsubstituted aryl, substituted or unsubstituted heterocyclyl, substituted or unsubstituted aralkyl, substituted or unsubstituted alkaryl, and a combination thereof.

Depending upon the type of block copolymer desired, the monomer mix may also include the following monomers:

Maleic anhydride, N-alkylmaleimide, H-arylmaleimide, dialkyl fumarate, cyclopolymerizable or a ring opening monomer, or a combination thereof. The monomer mix may also include macromonomers, which are compounds of the formula XI where L or M is a polymer chain.

The monomers or comonomers of the formula XI generally include one or more of acrylate and methacrylate esters, acrylic and methacrylic acids, styrene, acrylamide, methacrylamide, acrylonitrile, methacrylonitrile, vinyl esters and mixtures of these monomers, and mixtures of these monomers with other monomers. As one skilled in the art would recognize, the choice of comonomers is determined by their steric and electronic properties. The factors which determine copolymerizability of various monomers are well documented in the art. For example, see: Greenley, R. Z. in Polymer Handbook 3rd Edition (Brandup, J., and Immergut, E. H Eds.) Wiley: New York, 1989 p II/53.

The specific monomers or comonomers of the formula XI include one or more of the following:

Methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), methyl α-hydroxymethyacrylate, ethyl α-hydroxymethyacrylate, butyl α-hydroxymethyacrylate, N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylaminostyrene (all isomers), alpha-methylvinyl benzoic acid (all isomers), diethylamino alpha-methylstyrene (all isomers). p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, isoprene, chloroprene, ethylene and propylene.

Other suitable monomers include cyclopolymerizable monomers such as those disclosed in International Patent Application PCT/AU94/00433, and by Moad and Solomon in "The Chemistry of Free Radical Polymerization", Pergamon, London, 1995, pp 162–171 and ring opening monomers, such as those described by Moad and Solomon in "The Chemistry of Free Radical Polymerization", Pergamon, London, 1995, pages 171–186.

The monomers for the block copolymer are selected such that one of the segments U and V is solvophobic or immiscible in the dispersing medium and will have a tendency to aggregate, while the other is solvophilic or miscible or compatible with the dispersing medium.

The monomer(s) can be chosen so as to provide compatibility with any material to be encapsulated and for compatibility with the medium used in the end application.

A polymer will be soluble in the dispersing medium (usually a low molecular weight liquid) if the polymer and the medium are chemically similar or are constituted such that specific interactions, such as hydrogen bonding can take place between them. Solubility may also be enhanced or reduced by changing the temperature or pH of the dispersion.

The inventors have found that "solubility parameters" provide useful guidelines as to a degree to which a solvophobic block in a block copolymer partially dissolves in a dispersing medium. Solvophilic monomers are associated with low solubility parameters. Whereas those monomers that have relatively higher solubility parameters produce a solvophobic block that is relatively less soluble. It has been discovered that by making the use of the solubility parameter of the solvophobic block in a block copolymer, the formulator can choose monomers that will provide a micelle. Thus, by lowering the solubility parameter of a solvophobic block, which is accomplished by selecting a mix of monomers having lower solubility parameters, the solvophobicity of the resulting solvophobic block can be lowered. As a result, the formulator can achieve an optimal balance of the solvophobic/solvophilic blocks suitable for use in a wide variety of microgel applications, such as encapsulation or improving impact strength of a molding resin. Solubility parameters of monomers and polymers are known and can be obtained from several sources, such as, for example, from Solubility Parameter Values by E. Grulke in the Polymer Handbook, 3rd Edition (1989), edited by J. Brandrup and E. H. Immergut (publisher-John Wiley & Sons, New York, N.Y.) or from Handbook of Polymer-Liquid Interaction Parameters and Solubility Parameters by Allan F. M. Barton, 1990 edition (publisher-CRC Press, Boca Raton, Fla.).

Solvophilic monomers whose homopolymers are soluble or compatible with an aqueous medium include those monomers used to produce the polymers referred to on pages 21–25 of WO97/49387, as would be understood by persons skilled in this art.

Solvophobic monomers whose homopolymers are immiscible with an aqueous medium include those monomers used to produce the polymers referred to on pages 31–63 of WO97/49387, as would be understood by persons skilled in this art.

One of the advantages of RAFT polymerization is that it is compatible with a very wide range of monomers. It should be noted that it is possible to include a proportion of solvophilic monomers within the solvophobic block or vice versa (as may be necessary to incorporate crosslinking functionality or to provide compatibility with a material to be encapsulated) without disrupting the overall solvophilic-solvophobic balance.

The dispersing medium can be organic, water, or aqueous medium containing a co-solvent, such as alcohol. The medium is selected to ensure that solvophobic block of the block copolymer is insoluble but the solvophilic block is soluble. Depending on the nature of the block copolymer being utilized, a blend of various solvents may be necessary.

Preferred solvents include aromatic hydrocarbons, such as toluene, Solvesol 100, petroleum naphtha or xylenes; nitro paraffins, such as 1-nitropropane and 2-nitropropane, ketones such as, methyl amyl ketone, methyl isobutyl ketone, methyl ethyl ketone or acetone; esters such as, butyl acetate or hexyl acetate; and glycol ether esters such as, propylene glycol monomethyl ether acetate.

When the dispersing medium is water based, the medium often includes one or more solvents, which may be water-soluble or water reducible solvents, or a combination thereof.

Some of the suitable solvents include $C_1$ to $C_{12}$ mono and di-alcohols, such as, for example, isopropanol, ethanol, methanol, butanol, 2-ethylhexanol and dodecanol. Tetrahydrofuran, glycol ethers and glycol ether acetates are also suitable. Other solvents include toluene, hexane, butyl cellosolve, butyl cellosolve acetate, carbitol. Some of the solvents, for example, propylene glycol monomethyl ether, ethylene glycol hexyl acetate, ethylene glycol n-butyl ether, dipropylene glycol and methyl ether acetate are available from Dow Chemical Company, Midland, Mich. Isopropanol, methyl ethyl ketone and acetone are preferred.

If required and in order to reduce the HAPs, (Hazardous Atmospheric Pollutant) HAPs-free solvents, such as ethanol, butanol, butyl acetate, isobutanol, acetone, diacetone alcohol, methyl amyl alcohol, cyclohexanone, primary amyl acetate, methyl amyl ketone, 2-ethyl hexanol, propanol, ethyl acetate, tetrahydrofuran, isopropyl acetate, 2-ethyl hexyl acetate, ethyl 3-ethoxy propionate, pentyl propionate, ethanol, n-butyl propionate, tertiary butyl alcohol and 1-pentanol are also suitable.

The macromonomers of Formula IV include those disclosed in International Patent Application WO96/15157 and U.S. Pat. No. 5,264,530 the disclosures of which are incorporated herein by reference. Reaction conditions for the use of these compounds in producing activatable prepolymers are also disclosed. Preferably the macromonomer contains a maximum of two double bonds, more preferably one 1 double bond.

Macromonomers of this type can be prepared by a number of different methods. Two illustrative methods of preparation are (1) use of catalytic chain transfer agents containing $Co^{(II)}$ or $Co^{(III)}$; and (2) use of addition-fragmentation transfer agents. These methods are discussed by Rizzardo et al. in *Macromol. Symp.* 1997, 111,1.

Block copolymers with thiocarbonylthio groups may be prepared by the methods described in International Patent Publications WO 98/01478, WO 99/05099 and WO 99/31144 which are incorporated herein by reference. In particular thiocarbonylthio compound chain transfer agents and reaction conditions for the use of these compounds are disclosed in these publications The self-assembly (or micellization) of the block copolymers of the invention can occur when the inherent incompatibility of the blocks causes micellization, or, may be brought about by any known means. These include dispersion of the block copolymer in a non-solvent for one of the blocks; and, by changing the pH of the solution, for example, by ionizing one of the blocks.

Preferred solvophobic blocks contain solvophobic monomers, such as those with hydroxy functionality, acid functionality (for example carboxylic acid, sulphonic acid, phosphoric acid and/or phosphonic acid substituents) or quaternizable nitrogen (for example pyridine, primary, secondary or tertiary amino substituents). A solvophobic block may also be constructed by end-functionalization of a polymer, such as poly(ethylene oxide) or poly(lactic acid).

Preferred solvophilic blocks contain solvophilic residues, such as polymerized styrene, alkyl (meth)acrylates, alkyl ethenoates, and alkenes. A solvophilic block may also be constructed by end-functionalization.

Preferred reactive monomers suitable for crosslinking reactions include those containing reactive double bonds (for example, allyl (meth)acrylates, cinnamoyl (meth)acylates) epoxy (for example, glycidyl (meth)acrylate) isocyanate groups or anhydrides (for example maleic anhydride). Monomers containing other functionality including carboxylic acid (for example, methacrylic acid), hydroxy (for example, hydroxyethyl methacrylate), tertiary amino (for example, dimethylaminoethyl methacrylate), pyridinato (for example, vinyl pyridine), urethane or urea (for crosslinking with melamine derivatives) and the like are also suitable for crosslinking reactions.

The micelles produced in accordance with this invention may be stabilized by being crosslinked in the shell, the core, or both by adding a crosslinking reagent(s) or by activating reactive functionality, by irradiation or heating. The concentration of micelles is preferably chosen to limit intermicellar reaction, which might lead to macroscopic gel formation. This is particularly important when constructing shell-crosslinked micelles. A variety of processes for forming crosslinked micelles are described in the art (see, for example, Wooley et al. in WO97/49387) and those skilled in the art will, with the information provided herein, recognize that these and other processes may also be applied in conjunction with the present invention.

For example, a free radical initiator(s) and optionally a polymerizable monomer(s) may be added to a solution containing the micellized block copolymer which contains pendant double bonds and the solution then heated or irradiated to decompose the free radical initiator. The initiator(s) and monomer(s) are typically chosen for their solubility in the polymer segment containing the reactive functionality.

As a further example of crosslinking, a diol or diamine can be added to a solution containing a micellized block copolymer which contains pendant isocyanato groups. The number of pendant groups and the concentrations of reagents added will determine the crosslink density and thus the permeability of the crosslinked domain of the microgel particle.

Structures for preferred block copolymers for use in the present invention are shown by Formulae V–VIII, which are derived from I–IV, respectively.

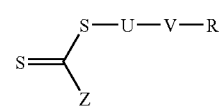

V

-continued

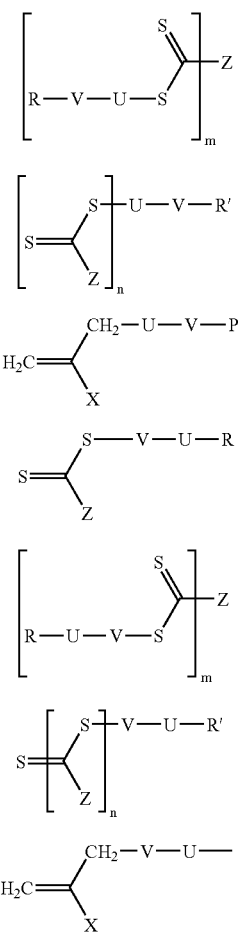

Note that the group Z may also be —SR then the block copolymer will have a structure of formula IX or X shown below.

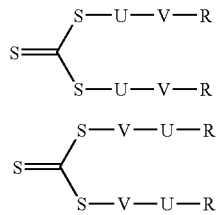

wherein:

R, R¹, Z, Z¹, P, U, V, X and n are as defined above; and where each R may be the same or different.

Examples of the monomer, which make up U and V, are disclosed in WO97/49387, which is incorporated herein by reference.

The crosslinkable group present in the crosslinkable block copolymers of this invention may be present in the groups R, R¹, Z, Z¹, P or X may be a reactive monomer incorporated into the radicals U or V by polymerization.

X, P, R and Z are groups derived from the RAFT agents of formulae I–IV.

The polymeric blocks U and V may themselves be block or random copolymers. For example, one preferred block copolymer is the structure where U is poly(butyl methacrylate-co-allyl methacrylate)-block-poly(butyl methacrylate) and V is poly(methacrylic acid).

In the aforedescribed block copolymer, block U is the more solvophobic block and block V is the more solvophilic block. Block U contains an allyl functionality capable of crosslinking by free radical polymerization.

Another preferred structure is where U is poly(hydroxyethyl methacrylate-co-2-ethylhexyl methacrylate-co-isobutyl methacrylate) and V is poly(acrylic acid-co-methyl methacrylate-co-methyl acrylate-co-styrene).

In the aforedescribed block copolymer, block U is the more solvophilic block, block V is the more solvophobic block, which also contains carboxylic functionality to enable crosslinking with, for example, a bis epoxide or a diamine.

Yet another preferred structure is where U is poly(hydroxyethyl methacrylate-co-2-ethylhexyl methacrylate-co-isobutyl methacrylate) and V is poly(glycidyl methacrylate-co-methyl methacrylate-co-methyl acrylate-co-styrene).

In the aforedescribed block copolymer, block U is the more solvophilic block, block V is the more solvophobic block, which also contains epoxy functionality to enable crosslinking with, for example, a diacid.

The overall molecular weight of the block copolymers of the invention is specified in terms of the block length expressed as the number average degree of polymerization, rather than a weight average molecular weight.

The block copolymers of the invention have a preferred block length of 5 to 1000, more preferably 5 to 100 and most preferably 5 to 50.

In terms of polydispersity, the block copolymers of the invention preferably have a polydispersity in the range of 1.01 to 2.5, more preferably in the range of 1.05 to 1.8 and most preferably in the range of 1.1 to 1.4.

The ratio of the two segments of a diblock copolymer is preferably in the range 1:20 to 20:1 and more preferably in the range 1:10 to 10:1 and most preferably in the range 1:5 to 5:1. The number average degree of polymerization and composition of the block copolymer are chosen with regard to the properties of particular monomers, the desired micellar structure and the intended application of the microgels.

In a typical process for preparing uniform particle size micelles the block copolymer is dispersed in a dispersing medium in which one component of the block is soluble (miscible) and the other less soluble or insoluble (immiscible). Dispersion of the block copolymer may be assisted by homogenization, ultrasonication, or heating. The component of the block that is soluble preferably forms the shell of the micelle and that which is less soluble or insoluble preferably forms the core of the micelle. The concentration of the block copolymer is chosen to be greater than the critical micelle concentration and sufficiently low such that discrete micelles of the desired size are formed. This concentration will depend on the critical micelle concentration for the block copolymer. It will typically be in the range 0.001 wt % to 70 wt %, more preferably in the range 0.1 wt % to 10 wt %. Note, however, that for applications where particle size variation is less critical it can be desirable for environmental and economic reasons to use maximum solid levels.

For example, poly(butyl methacrylate)-block-poly(methacrylic acid), a solvophobic-solvophilic block copolymer, may be dispersed in water, a solvophilic solvent, to form micelles in which the methacrylic acid segment forms the shell and the butyl methacrylate segment forms the core of the micelle. The same block copolymer may be dispersed in a hydrocarbon solvent to form an inverse micelle in which the methacrylic acid segment forms the core.

Micellization can also be achieved by taking a solution of the block copolymer in a mutual solvent, and then dispersing this solution in a non-solvent for one of the blocks thus changing the ratio of solvent to non-solvent. It is also possible to devise a one-pot process for a block copolymer synthesis and micelle formation.

The micelles thus produced are then stabilized to form by microgel. The stabilizing step is achieved by crosslinking one or more crosslinkable functionalities provided on the solvophilic, solvophobic block, or both. Some of the suitable functionalities include an epoxide, carboxylic, derivative of carboxylic, anhydride, hydroxyl, isocyanate, allyl, cinnamoyl, tertiary amino, pyridinato, urethane, urea or a combination thereof. During the stabilization step, some of the foregoing crosslinkable functionalities, such epoxide, can be self-crosslinked by either elevating the temperature of the dispersing medium or by adding a conventional catalyst. Alternatively, another crosslinking agent can be added, such as, for example, adding polyepoxide when the crosslinking functionality is carboxylic.

When solvophobic block is provided with a crosslinkable functionality, microgel with high solids level, of the order of 0.1 weight percent to 70 percent, preferably 10 weight percent to 30 weight percent, can be attained.

When solvophilic block is provided with a crosslinkable functionality, microgel with lower solids level, of the order of 0.001 weight percent to 10 percent, can be attained.

In addition, it is contemplated that the solvophobic and solvophilic blocks, or both of the block copolymer provided with the crosslinkable functionality can be further provided with a polymerizable functionality, such as allyl, to chain extend the block. Depending upon whether one wishes to chain extend solvophilic or solvophobic block, a monomer chosen should be capable of migrating to the solvophobic block or to the solvophilic block. For example, when the solvophobic block includes allyl as a polymerizable functionality, chain extension occurs when methyl methacrylate or styrene is sued as a monomer. The foregoing chain extension also requires the presence of a free radical initiator, such as 4,4'-azobis(4-cyanopentanoic acid), which can be sufficiently solvophobic for it to migrate to the hydrophobic block, where the chain extension can then take place and not in the dispersing medium.

Alternatively, stabilizing of micelles can be achieved by chain extending the solvophilic, solvophobic block, or both. The chain extension can be achieved by providing the solvophobic and solvophilic blocks or both of the block copolymer with a polymerizable functionality, such as allyl to chain extend the block. Depending upon whether one wishes to chain extend solvophilic or solvophobic block, a monomer chosen should be capable of migrating to the solvophobic block or to the solvophilic block. For example, when the solvophobic block includes allyl as a polymerizable functionality, chain extension occurs when methyl methacrylate or styrene is sued as a monomer. The foregoing chain extension also requires the presence of a free radical initiator, such as 4,4'-azobis(4-cyanopentanoic acid), which can be sufficiently solvophobic for it to migrate to the hydrophobic block, where the chain extension can then take place and not in the dispersing medium.

The invention may further include:
(A) Adding in the step (ii) a material to be encapsulated, and then encapsulating the material in the microgel in the (iii)-stabilizing step.

(B) Alternatively, and in addition to the foregoing, microgel may be post-preparatively modified by chain extending the arms.

Third-party molecules include molecules that would otherwise be difficult to solubilize or disperse such as an organic molecule, dye molecule, organic pigment, inorganic pigment, catalyst, aluminum flake, talc flake, fiber, foam, toxic molecule, biocide, herbicide, insecticide, pharmaceutical drug molecule, bio-active material or genetic material.

In regard to the encapsulation of third-party molecules or particles (point A above), the following preferred embodiments of the above procedure may be employed either completely or in part:

(I) Procedure:
(i) The block copolymer may be dispersed in a medium in which it micellizes.
(ii) The material to be encapsulated is then added to the dispersing medium. The material is preferably partially soluble in the dispersing medium, but highly soluble in the micelle, and so it migrates through the dispersing medium to the micelle.
(iii) The micelles are then stabilized, preferably through crosslinking to encapsulate the material in a microgel.

3. Procedure:
(i) The material to be encapsulated may be added to a carrier medium, where it preferably forms a partially solubilized suspension.
(ii) The block copolymer dispersed in a dispersing medium in which the copolymer micellizes to form crosslinkable micelles, which can then be added to the partially solubilized suspension. The material to be encapsulated migrates to the micelles.
(iii) The micelles are then stabilized, preferably through crosslinking to encapsulate the material in a microgel.

3. Procedure
(i) The block copolymer may be dispersed in a medium in which it micellizes.
(ii) The micelles are then stabilized, preferably through crosslinking to form microgel.
(iii) The microgel is then immersed in a carrier medium containing the material to be encapsulated. The material to be encapsulated is more soluble in the microgel than in the carrier medium, and so it migrates to into the microgel.
(iv) The microgel containing the encapsulated material may be separated from the dispersing medium by either destabilizing the microgel in medium (altering the nature of the dispersing medium to permit the microgel to precipitate).

The products of the above processes may consequently include:

3. Non-crosslinked intermediate block copolymer micellar dispersions,
(b) Micelles with a crosslinked shell,
(c) Micelle with a crosslinked core,
(d) Micelle with both their core and shell crosslinked,
(e) Post-reacted crosslinked micelles.

The microgel of the present invention can be added to coating compositions, such as automotive OEM or refinish paints either as a dispersant for encapsulating materials, such as pigments, dyes and aluminum flakes or as a viscosity modifier. The microgel can be also added to a molding compound, such as a thermoplastic or a thermosetting resin to improve impact resistance of molded articles produced therefrom.

The microgels formed by the present invention, while sometimes being spherical may also have a more complex shape or structure that is dictated by the nature of the block copolymer and the conditions of assembly and the ultimate application.

Thus, the microgels of the present invention can assume a variety of shapes and morphologies. Shapes include spheres, disks, needles, cones, ellipsoids, vesicles, globules or any other shape that may be formed by self-assembly of suitably constructed block copolymers. Particles may be of core/shell, core/sheath morphology. Core/shell particles with shell phases incompletely encapsulating the core, core/shell particles with a multiplicity of cores and interpenetrating network particles are also contemplated. In all of these cases the majority of the surface area of the particle will be occupied by at least one outer phase and the interior of the polymer particle will be occupied by at least one inner phase. The desired morphology will depend on the application and is controlled by selection of the block copolymer composition, its concentration, the dispersing medium and other process conditions, such as temperature, pH and ionic strength.

Microgels can also be used to improve the ease of processing by acting as lubricants or as rheology modifiers. They can improve the structural strength and dimensional stability of products, such as coating compositions and molding resins. When used as a toughening agent or as an additives for a high impact polymer resins, the microgel will typically be prepared with a crosslinked core of a low $T_g$ block that provides stress relief to a molded article. Examples of low $T_g$ polymers include acrylate esters, such as 2-ethylhexyl acrylate, siloxanes, polyalkylene oxides and polybutadiene. The arms of the microgel will be chosen to be miscible or compatible with the matrix polymer and will typically have a block length greater than the entanglement molecular weight of the matrix polymer.

Microgels can be used to encapsulate particles or molecules. They can be used to solubilize or disperse a molecule that would otherwise be difficult to solubilize or disperse. For example, coating compositions which incorporate microgels of this invention may include any of the conventional pigments typically used in conventional or waterborne paints, such as metallic oxides, including titanium dioxide, iron oxides of various colors, zinc oxide; carbon black; filler pigments such as, talc, china clay, barytes, carbonates, silicates; a wide variety of organic pigments such as, quinacridones, phthalocyanines, perylenes, azo pigments, indanthrones; carbazoles such as, carbazole violet, isoindolinones, isoindolones, thioindigo reds, and benzimiadazolinones; dye molecules; catalysts and aluminum flakes used in metallic paints.

Microgels can be used for concentrating various species from solutions, and as sequestering agents generally, such as for removing toxins, for concentrating metal ions, or dye molecules so as to prevent dye transfer during laundering. In this application one phase of the microgel will be fashioned to have an affinity for the species to be sequestered and the other phase of the microgel will be fashioned to promote dispersion of the microgel in the dispersing medium and for ease of separating the microgel containing the sequestered material from the dispersing medium.

Microgels can also be used as nanoscale reaction vessels when a reagent encapsulated in or attached to the microgel is contacted with other reagents added to or present in the dispersing medium. Such as application is most suited for combinatorial chemistry, sensors and diagnostics.

The shell and core crosslinked micelles of the present invention are well suited for use in a wide range of pharmaceutical, therapeutic and agrochemical applications. For example, such micelles can be used for controlled delivery of drugs, diagnostics, herbicides, pesticides and other bioactive materials, such as those disclosed by Wooley et al. In WO97/49387 (shell crosslinked systems) or Nair in U.S. Pat. No. 5,078,994 (core crosslinked systems), both of which are incorporated herein by reference. The applicability of the aforedescribed methods can be greatly expanded, as the microgels of the present invention can be prepared in a wide variety of structures or compositions to tailor them for a specific controlled delivery application.

Microgels of this invention are also suitable for use in many coating applications, such as automotive OEM and refinish coatings; industrial coatings, such as coil coatings, wood finishes and floor finishes; printing inks; coatings on solvent sensitive substrates, such as, leather; sealers; over print varnishes; label varnishes; paper coatings; ceramic binders; coatings over vacuum metallized articles, coatings over polymeric substrates, traffic and zone marking paints, glaze coatings, wall coatings, clear coatings on delicate substrates, such as those of art objects.

It may be desirable to add other optional ingredients to the coating composition, such as antioxidants; flow control agents; rheology control agents, such as fumed silica and non-aqueous dispersions (NADs); UV stabilizers; UV screeners, quenchers and absorbers.

In coating applications microgels may also be fashioned to act as rheology modifiers, dispersants, wetting agents, slip agents, mar reducing agents, defoamers, plasticizers and corrosion inhibitors.

The invention will now be demonstrated by, but is in no way limited to, the following examples.

EXAMPLES

The following two examples illustrate the synthesis of a solvophobic-solvophilic ABC triblock copolymer containing allyl methacrylate units in a solvophobic C block.

Example 1

Preparation of Methacrylic Acid Macromonomer

A 5 neck, 1000 mL reactor equipped with mechanical stirrer was charged with 600.5 g distilled water, which was then purged by bubbling $N_2$ gas through the solution for 20 minutes while the reactor contents were heated to 60° C. The monomer feed was commenced at 2.5 mL/min.

| Feed: | |
|---|---|
| Methacrylic acid (inhibited with 150 ppm MEHQ) | 277 g |
| Cobalt catalyst [iprCo(III)(dpg-BF$_2$)$_2$] | 34 mg |

The following shots were added to the reactor at the commencement of the monomer feed:

| Shot 1: | |
|---|---|
| Initiator (Wako-VA-044) | 1.2 g |
| Distilled water | 12 g |

-continued

| Shot 2: | |
|---|---|
| Cobalt catalyst | 30.2 mg |
| Acetone (AR) | 5.0 mL |

After 60 minutes had elapsed (from commencement of monomer feed), the following Shot 3 was added:

| Shot 3 | |
|---|---|
| Initiator | 0.6 g |
| Distilled water | 6 g |

After the monomer feed was complete, shot 4 was added and the mixture post-reacted at 60° C. for a further 60 minutes:

| Shot 4 | |
|---|---|
| Initiator | 0.6 g |
| Distilled water | 6.1 g |

The macromonomer was isolated from the solution on a Rotary evaporator (house vacuum, water bath 80° C.) to yield a pale brownish powder, which was redissolved in distilled water (approx. 25% w/v polymer) with warming (water bath) to aid dissolution. The macromonomer product was isolated again using the Rotary evaporator, yielding a pale blue-green solid, which could be readily powdered. The macromonomer was ground to powder using a mortar and pestle and then dried in a vacuum oven overnight (30 mm Hg @ oven temperature of 80° C.).

Characterization:

$^1$H NMR in dmso-$d_6$ indicated that no residual monomer was present. Integration of the terminal double bond resonances compared with total polymer indicated a number average molecular weight of 1200, corresponding to an average of 14 methacrylic acid units per macromonomer chain.

Preparation of poly(methacrylic acid)-block-poly(butyl methacrylate)-block-poly(allyl methacrylate-co-butyl methacrylate)

A 3 neck, 250 mL reactor equipped with magnetic stirrer, condenser and gas purge was charged with 40.34 g AR isopropanol and 10.04 g methacrylic acid macromonomer. The reactor contents were heated to reflux (80° C.) to dissolve the macromonomer and then purged by bubbling N$_2$ gas through the solution for 20 minutes

| Initial charge: | |
|---|---|
| Methacrylic acid macromonomer | 10.0 g |
| Isopropanol | 40.3 g |

The monomer feed was commenced at 0.06 mL/min over 150 minutes.

| Feed 1: | |
|---|---|
| n-butyl methacrylate | 8.05 g |

The following shot was added to the reactor at the commencement of the monomer feed.

| Shot 2: | |
|---|---|
| Initiator [azobis(isobutyronitrile)] | 0.21 g |
| Acetone | 1.43 g |

After 150 minutes had elapsed (from commencement of monomer feed), the following Feed 2 was added:

| Feed 2: | |
|---|---|
| n-butyl methacrylate | 4.1 g |
| Allyl methacrylate | 4.0 g |

The following shot was added to the reactor at the commencement of the monomer feed.

| Shot 2: | |
|---|---|
| Initiator [azobis(isobutyronitrile)] | 0.1 g |
| Acetone | 0.8 g |

After 90 minutes had elapsed (from commencement of the second monomer feed), shot 3 was added and the mixture was heated at 80° C. for a further 90 minutes

| Shot 3: | |
|---|---|
| Initiator [azobis(isobutyronitrile)] | 0.1 g |
| Acetone | 0.9 g |

Total reaction time was 330 minutes. The reaction mixture was cooled to room temperature.

Isolation

The block copolymer was isolated from the solution on a Rotary evaporator (house vacuum, water bath 80° C.) to yield a white powder. This was redissolved in isopropanol (approx. 25% w/v polymer) with warming to aid dissolution. The block copolymer product was isolated again using the Rotary evaporator, yielding a white solid, which could be easily powdered. The block copolymer was ground to powder using a mortar and pestle and then dried in a vacuum oven overnight. (30 mmHg @ oven temperature of 80° C.).

Gel permeation chromatography of the co-polymer indicated a peak molecular weight ($M_p$) of 2405 g mol$^{-1}$. $^1$H NMR evidence was consistent with this value.

Conversion of monomer to polymer was >90%

The following examples illustrate the use of a solvophobic-solvophilic ABC triblock copolymer containing allyl methacrylate units in a solvophobic C block and in the formation of a core crosslinked micelle, which encapsulates a dye.

Example 2

The use of poly(methacrylic acid)-block-poly(butyl methacrylate)-block-poly(allyl methacrylate-co-butyl methacrylate) in the formation of a core crosslinked micelle containing a dye The poly(methacrylic acid)-block-poly(butyl methacrylate)-block-poly(allyl methacrylate-co-butyl methacrylate) (MAA-BMA-AMA) prepared in Example 1 (0.1 g) was dissolved in methanol (30 mL). While stirring, water (70 mL) was added. A slightly turbid solution with a blue tinge was obtained. To establish the nature of the solution, pyrene (0.004 g) was added as a fluoresence probe (*Langmuir*, 1990, 6, 514–516) and the mixture allowed to stir for 15 h to equilibrate. Pyrene is an organic dye which is poorly soluble in water. In a 70:30 mixture of water-methanol, pyrene displays a fluoresence excitation spectrum containing the (0,0) band at 330.0 nm ($\lambda_{em}$396 nm). However the same band was shifted to 332.6 nm in the micellar solution above, indicating that the pyrene was not in open solution. A cast film of pyrene in MAA-BMA-AMA exhibits the band at 332.6 nm. Thus, the solution of the co-polymer contained micelles in which the pyrene was solubilised. Particle sizing experiments established the average micelle size as 40 nm (95% distribution: 25–61 nm).

An alternative method to establish the formation of micelles and characterise the environment inside the micelles compares the intensity of the $I_3$ and $I_1$ emission bands in pyrene (*Aus. J. Chem.* 1987, 40, 1). In a 70:30 mixture of water-methanol, pyrene displays a fluorescence emission spectrum having from $I_3/I_1$=0.73. When the co-polymer is present, that changes to $I_3/I_1$=1.05. A higher value (>1) of this ratio is characteristic of a non-polar environment (in hexane alone $I_3/I_1$=1.52; in water alone $I_3/I_1$=0.59). Thus, the micelles enclose a relatively non-polar environment in which the pyrene resides.

The mixture was then heated to 50° C. and styrene (0.03 g) was added. This mixture was stirred for 12 h to equilibrate and then polymerized overnight with azobisisobutyronitrile (AIBN) (0.004 g) under inert atmosphere, to form the corresponding core shell microgel. After cooling to ambient temperature, the excitation spectrum of the mixture displayed a shift in the pyrene (0,0) band to 347.0 nm. This result is consistent with the presence of polystyrene about each pyrene molecule in the core of the microgel. Particle sizing experiments indicated the expected increase in the average particle size to 68 nm (95% distribution: 43–98 nm).

Stability of the Microgel to a Change in Solvent Polarity

The stability of the polymerized microgel to dissociation was shown in the following experiment. The solution containing the crosslinked micelle prepared in the above experiment possesses a distinct hazy, blue tinge characteristic of a microscopic dispersion. Addition of methanol (30 drops) to the solution (1 mL) gave no change in this appearance. The microgel therefore persisted when the solvent medium was made less polar. However, a control experiment performed on a solution of the uncrosslinked micelles (i.e. before formation of the core-crosslinked microgel) became clear and lost the hazy blue tinge when treated with methanol under identical conditions. This indicates that the uncrosslinked micelles dissociate when the medium is made less polar. The crosslinking process therefore stabilizes the micelles.

Example 3

The poly(methacrylic acid)-block-poly(butyl methacrylate)-block-poly(allyl methacrylate-co-butyl methacrylate) prepared in Example 1 (0.5 g) was dissolved in isopropanol (5 mL) and this mixture was added dropwise to stirred water (150 mL) at 95° C. The resulting solution was stirred for 30 min at this temperature during which time the alcohol evaporated. After cooling to 80° C., 0.2 g of the dye was added. Extraction and dispersion of the dye into the solvophobic core of micelles formed by the co-polymer was found to occur within 4 hours.

At this stage a cross-linking reaction was undertaken. The mixture above was thoroughly degassed by bubbling nitrogen gas through it and maintaining an atmosphere of nitrogen above it. After degassing and stirring for 3 hours, the temperature of the above mixture was maintained at 80° C. and the radical initiator (AIBN) (20 mg) was added. While stirring vigorously, methyl methacrylate (0.1 g) was then added at a rate of 0.0017 g per minute (1 hour for complete addition). Polymerization was allowed to continue for a further 3 hours. The properties of the encapsulated dye in the resulting mixture (henceforth referred to as Mixture A) were then tested.

The extent of solubilization and dispersion of dyes in micelles or unicelles formed by the block co-polymer may be assessed by determining changes in the physical environment of the dye using solvatochromic or related photophysical properties (e.g. shifts to higher or lower energy of the absorption spectra, changes in the relative intensity of different absorption/emission bands, or fluorescence decay times). The dye employed in this example displayed a fluorescence decay half-time (FDH) which was highly characteristic of its environment. In its granulated solid state, the FDH of the dye was 1.5–2.5 time units. When the dye was cast, in a highly dispersed form, in a polymer film, a higher FDH was obtained (3.0–4.3 time units in a polystyrene film, 4.3–5.1 time units in a polymethylmethacrylate film). When dissolved in a solvent under air, a very short FDH (0.2–0.3 time units in xylene) was observed due to the influence of oxygen present in the solution.

The FDH of the dye in Mixture A was 3.7–3.8 time units, indicating a high level of dispersion which was similar to that achieved in cast polymer films. This value remained stable over a 24 hour monitoring period.

Large quantities of aluminosilicate solids were then added to Mixture A in order to test the stability of the core crosslinked micelles. Aluminosilicate solids typically destabilize and disrupt micelle formation by solvophilic-solvophobic block co-polymers. The FDH of the dye in the mixture remained unchanged, however, or slowly decreased to stabilize at 2.4–3.0 time units over the course of several hours. This indicated that the micelles remained largely intact and were generally unaffected by the aluminosilicate solids, although some micelles did become unstable.

The following example demonstrates the use of non-crosslinked micelles and their lack of stability in the presence of aluminosilicate solids.

Comparative Example

In this example, one of the following block co-polymers was employed;

1. $(PMAA)_{860}$-b-$(PbuMA)_{1422}$
2. $(PbuMA)_u$-b-$(PAA)_u$
3. $(PEG)_{750}$-b-$(Psty)_{7,000}$
4. $(PEG)_{750}$-b-$(PbzMA)_{10,000}$ where the general formulation:

(block 1)$_{mw1}$-b-(block 2)$_{mw2}$ refers to a di-block co-polymer consisting of two blocks, block 1 and block 2, having average molecular weights mw1 and mw2, respectively, and where the subscript u refers to a block having an unknown average molecular weight.

And where;

PAA refers to a block consisting of poly(acrylic acid) (solvophilic), PbuMA refers to a block consisting of poly(butyl methacrylate) (solvophobic), PbzMA refers to a block consisting of poly(benzyl methacrylate) (solvophobic), PEG refers to a block consisting of poly(ethylene glycol) (solvophilic), PMAA refers to a block consisting of poly(methacrylic acid) (solvophilic), Psty refers to a block consisting of polystyrene (solvophobic).

Each of the above block co-polymers is partially soluble in the non-polar commercial solvent, Isopar® M. When any one of polymers 1–4 was added in 0.1 g quantities to 100 mL of Isopar® M, a suspension formed. This suspension consists mainly of particles of solid co-polymer in a dynamic solid-solute equilibrium with small quantities of dissolved co-polymer. A fluorescent, solvophilic ruthenium-phenanthroline salt was added in small quantities (0.002 g). The salt employed was totally insoluble in Isopar® L; in a suspension in Isopar® M alone it exhibited a fluorescence decay half-life (FDL) of 2.0 μs, which is characteristic of solid particles of the salt. However, in the presence of one of the block co-polymers, the FDL of the salt was found to progressively increase to 3.0–3.7 μs over a period of 4–5 h, and thereafter remain invariant for the rest of the monitoring period. Such values are also obtained when the salt is dispersed within cast films of the above polymers. Solute block co-polymers therefore form micelles into whose core the amphiphilic dye was dispersed.

The addition of powdered aluminosilicate solids, to the above mixtures resulted in an immediate decrease in the FDL of the salt to 1.9–2.3 μs, which is characteristic of the granulated solid form of the salt. The dye therefore became de-solubilized and de-dispersed; the micelles of the solute block copolymers must have been destabilized by the presence of the polar solids causing expulsion from the solvophilic core.

The following Examples (4–6) relate to the synthesis of a microgel formed from a core cross-linked micelle or micel-ler aggregate for application as dispersants or rheology control agents in coatings formulations.

The following example illustrates the synthesis of a ternary copolymer for use as the "arm" component of a microgel using cumyl dithiobenzoate as a RAFT agent.

Example 4

The "arm" component of the diblock copolymer consists of an acrylate copolymer based on: 2-ethylhexyl methacrylate (EHMA), isobutyl methacrylate (IBMA), and 2-hydroxyethyl methacrylate (HEMA) in a mass ratio of 5:4:1.

The reactor was charged with 2-ethylhexyl methacrylate (1000 g), isobutyl methacrylate (800 g) hydroxyethyl methacrylate (200 g) cumyl dithiobenzoate (56 g) and toluene (700 g), sparged with nitrogen for 40 minutes and then brought to reflux. Then 28 g in 200 g of toluene of Vazo®88 initiator supplied by DuPont Company, Wilmington, Del. was fed over 240 minutes, and reflux was maintained for 2 hours. The conversion was determined gravimetrically and the molecular weight determined by GPC(% conversion=86%, Mn 8,510. Mw/Mn=1.95).

In following example, a block copolymer is synthesized, assembled then crosslinked by way of acid groups present in the core (9 wt % on comonomers) with the use of a bis epoxide (Araldite CY-184) with a Lewis acid catalyst (CP66).

The chemical name CP66 is 2-butenyltetramethylene-sulfonium hexafluoroanthimonate.

Example 5

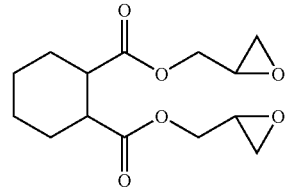

CY184

A flask containing 'arm' component (272 g at 70% solids, Example 4), acrylic acid (28 g, 9 wt % on 'core' monomers), methyl methacrylate (140 g), methyl acrylate (88 g), styrene (50 g), heptane (242 g) and mineral spirits (65 g) was brought to reflux and (8 g) in mineral spirits (93 g) and butanol (17 g) of Vazo®67 initiator supplied by DuPont Company, Wilmington, Del. was fed over 244 minutes. Micelle formation began within 30 min. 93% conversion. $M_n$ 16,000. $M_w/M_n$=2.90.

To an aliquot of this mixture was added 0.5 mole equivalents of CY184 (based on acrylic acid) and 0.5 wt % CP66 (based on total solids). The mixture was gently heated to reflux and the course of the crosslinking followed by acid number (initial acid number=31). After 4 hrs (acid number=14) another aliquot of CY184/CP66 was added and the heating continued for an additional 17 hrs (21 hrs in total) (acid number=2). The formation of particles (crosslinked micelles) was clearly visible (insoluble). The yield of the reaction (or efficiency of the process) was measured by determining the % solubles (non-linked polymer). This involves dissolving known amounts of reaction mixture into THF. Centrifugation, isolation of the supernatant and evaporation of the solvent gives the % soluble. In this experiment the % solubles=35%. This represents a yield for the microgel of 61 wt. %.

The following example illustrates the use of an epoxy monomer (glycidyl methacrylate) and crosslinking with a polycarboxylic acid (trimellitic anhydride (TMA))

Example 6

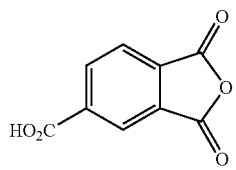
TMA

A flask containing 'arm' component (400 g at 70% solids, Example 4), glycidyl methacrylate (33 g, 7 wt % based on comonomers), methyl methacrylate (233 g), methyl acrylate (139 g), styrene (74 g), heptane (356 g) and mineral spirits (96 g) was brought to reflux and (12 g) in mineral spirits (100 g) of Vazo®65 L initiator supplied by Du Pont company, Wilmington, Del. was fed over 6 hrs. Micelle formation began within 30 min.>95% conversion. $M_n$ 17,500. $M_w/M_n$=2.60. At a higher GMA content (14 wt %) we observed gelation.

To an aliquot of this mixture was added 0.33 mole equivalents of TMA (based on glycidyl methacrylate) and the mixture was gently heated to reflux. Reflux was continued for 29 hrs before the mixture was analyzed for % solubles. In this experiment the % solubles=39%. This represents a yield for the microgel of 61 wt. %.

Example 7

A clearcoat composition is prepared by mixing together the following components, where all parts are parts by weight:

| | |
|---|---|
| Cymel ® 1168 methylated and isobutylated melamine formaldehyde resin having a degree of polymerization of about 1.75* | 122.0 parts, |
| Tinuvin ® 900 solution** (30% of a benzotriazole UV light stabilizer in xylene) | 37.0 parts, |
| Tinuvin ® 079 solution*** (a 40% solids hindered amine light stabilizer in xylene) | 13.8 parts, |
| Siloxane solution (70% Dow Corning 62230 having the structural formula set forth above where R is methyl and phenyl in Solvesso 100 aromatic solvent) | 236.0 parts, |
| Acrylic Resin B (prepared below) | 162.0 parts, |
| Microgel prepared according to examples 6, | 217.0 parts, |
| Dodecylbenzene sulfonic acid (70% in isopropanol) | 9.8 parts, |
| Xylene | 45.0 parts, |
| Butanol | 35.0 parts, |
| Methanol | 13.0 parts, |
| Total: | 890.6 parts |

*supplied by Cytec Industries, Stamford, Connecticut
**supplied CIBA Chemicals, Tarrytown, New York
***supplied CIBA Chemicals, Tarrytown, New York The resulting clearcoat composition contains 25% acrylic resin B, 30% siloxane oligomer, 23% microgel, and 22% alkylated melamine formaldehyde crosslinking resin. The clearcoat composition is adjusted with xylene to a 28 second viscosity determined with a #4 Ford Cup. The weight solids at this viscosity is 58% (60 min. at 110° C.). A dark blue metallic polyester modified acrylic melamine basecoat is sprayed over an electrodeposited primed steel panel. After a 5 minute wait, the above clearcoat composition is sprayed over the basecoat. Two coats are applied to provide a 50 micron (2-mil) clear coat film thickness. The wet basecoat/clearcoat composition is baked for 20 minutes at 130° C.

The resultant coating has a high gloss (93° on a 20° gloss meter). The hardness is 8 knoop units as measured with a Tukon Hardness Machine. The coating is resistant to solvents as shown by the following tests:

100 double rubs with xylene or methylethyl ketone has no effect; immersion in gasoline for 20 cycles of 5 minutes each and shows no degradation. The coating has excellent resistance to etching as shown by the following test:

The coated panel is exposed to 10% sulfuric acid for 15 minutes on a thermal gradient bar, there is no etching of the surface below 55° C.; etching increased with intensity as the temperature on the gradient bar increased over the above temperature.

Acrylic resin B is prepared by preparing a polymer of 15% sytrene, 30% butyl methacrylate, 17% butyl acrylate, 38% hydroxypropyl acrylate at 70% solids in 3/1 Solvesso 100/Xylene. The viscosity of the resin is Y-Z1 on the Gardner-Holdt scale measured at 25° C. The weight average molecular weight is 9800.

What is claimed is:

1. A process for preparing a microgel comprising:
   (i) RAFT polymerizing in the presence of a RAFT chain transfer agent, one or more solvophobic monomers and one or more solvophilic monomers to form one or more block copolymers comprising one or more solvophobic blocks and one or more solvophilic blocks wherein said solvophobic block is insoluble in a dispersing medium and said solvophilic block is soluble in said dispersing medium;
   (ii) dispersing said block copolymer in said dispersing medium to form micelles; and
   (iii) stabilizing said micelles to form said microgel.

2. The process of claim 1 wherein said solvophobic block, solvophilic block, or both of said blocks, are provided with one or more crosslinkable functionalities.

3. A process of claim 2 wherein said crosslinkable functionalities are selected from the group consisting of an epoxide, carboxylic, derivative of carboxylic, anhydride, hydroxyl, isocyanate, allyl, cinnamoyl, tertiary amino, pyridinato, urethane, urea and a combination thereof.

4. The process of claim 2 or 3 wherein said step (iii) comprises crosslinking said crosslinkable functionalities.

5. The process of claim 1 wherein said step (iii) comprises chain extending said solvophilic or solvophobic block of said copolymer.

6. The process of claim 1 wherein said chain transfer agent is selected from the group consisting of:

(I)

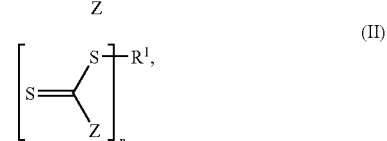
(II)

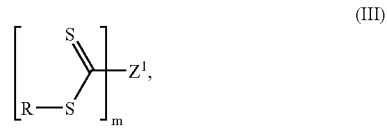
(III)

-continued

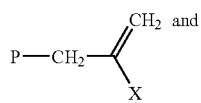
(IV)

a combination thereof, wherein R, $R^1$ and P are free radical leaving groups; and wherein, R is selected from the group consisting of unsubstituted or substituted $C_1$ to $C_{18}$ alkyl, unsubstituted or substituted alkenyl, unsubstituted or substituted alkynyl, unsubstituted or substituted saturated carbocyclic ring, unsubstituted or substituted unsaturated carbocyclic ring, unsubstituted or substituted aromatic carbocyclic ring, unsubstituted or substituted saturated heterocyclic ring, unsubstituted or substituted unsaturated heterocyclic ring, unsubstituted or substituted aromatic heterocyclic ring, unsubstituted or substituted alkylthio group, and a first polymer chain having a number average degree of polymerization in the range of 5 to 1000;

Z is selected from the group consisting of hydrogen, chlorine, unsubstituted or substituted $C_1$ to $C_{18}$ alkyl, unsubstituted or substituted aryl, unsubstituted or substituted $C_3$ to $C_{18}$ heterocyclic ring, unsubstituted or substituted $C_1$ to $C_{18}$ alkylthio, SR, unsubstituted or substituted arylthio, unsubstituted or substituted $C_1$ to $C_{18}$ alkoxy, unsubstituted or substituted aryloxy, unsubstituted or substituted amino, unsubstituted or substituted $C_1$ to $C_{18}$ alkoxycarbonyl, unsubstituted or substituted aryloxycarbonyl, carboxy, unsubstituted or substituted $C_1$ to $C_{18}$ acyloxy, unsubstituted or substituted aroyloxy, unsubstituted or substituted carbamoyl, cyano, $C_2$ to $C_{18}$ dialkyl-phosphonato, diaryl-phosphonato, $C_1$ to $C_{18}$ dialkyl-phosphinato, diaryl-phosphinato and a second polymer chain having a number average degree of polymerization in the range of 5 to 1000;

$R^1$ is an n-valent moiety derived from R;

$Z^1$ is an m-valent moiety derived from a species selected from the group consisting of unsubstituted or substituted $C_1$ to $C_{18}$ alkyl, unsubstituted or substituted aryl and a third polymer chain having a number average degree of polymerization in the range of 5 to 1000 wherein the connecting moieties in said polymer chain are selected from the group consisting of $C_1$ to $C_{18}$ aliphatic carbon, aromatic carbon, oxygen, sulfur and a combination thereof;

P is an oligomer or polymer having a number average degree of polymerization in the range of 2 to 1000 or said first polymer chain;

X is selected from the group consisting of unsubstituted or substituted aryl, $C_1$ to $C_{18}$ alkoxycarbonyl, unsubstituted or substituted aryloxycarboyl, carboxy, unsubstituted or substituted aryloxycarbonyl, $C_1$ to $C_{18}$ carboxy, and cyano;

n and m are integers in the range of 1 to 6; and wherein the substituents for the substituted groups for R, $R^1$, Z, $Z^1$ and X are independently selected from the group consisting of hydroxy, tertiary amino, halogen, cyano, epoxy, carboxylic acid, alkoxy, alkyl having 1 to 32 carbon atoms, aryl, alkenyl having 2 to 32 carbon atoms, alkynyl having from 2 to 32 carbon atoms, saturated carbocyclic rings having 3 to 14 carbon atoms, unsaturated carbocyclic rings having 4 to 14 carbon atoms, aromatic carbocyclic rings having 6 to 14 carbon atoms, saturated heterocyclic rings having 3 to 14 carbon atoms, unsaturated heterocyclic rings having 3 to 14 carbon atoms and aromatic carbocyclic rings having 6 to 14 carbon atoms.

7. The process of claim 1 wherein the dispersing medium is a hydrocarbon and at least 70 mole percent of monomers comprising the solvophilic block are selected from the group consisting of isobutyl methacrylate, isobutyl acrylate, 2-ethylhexyl methacrylate, 2-ethylhexyl acrylate, isobornyl methacrylate, isobornyl acrylate, and a combination thereof; and at least 70 mole percent of monomers comprising the solvophobic block are selected from the group consisting of styrene, methyl acrylate, methyl methacrylate, hydroxyethyl acrylate, hydroxyethyl methacrylate, hydroxypropyl acrylate, hydroxypropyl methacrylate, acrylonitrile, tertiary-butylaminoethyl methacrylate, and a combination thereof.

8. The process of claim 7 wherein said hydrocarbon comprises heptane and mineral spirits.

9. The process of claim 6 wherein said block copolymer is of the formula:

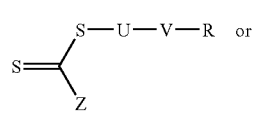
V

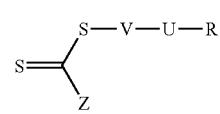
Va when said chain transfer agent is of the formula I, wherein U is said solvophobic block and V is said solvophilic block.

10. The process of claim 6 wherein said block copolymer is of the formula:

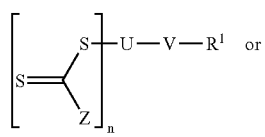
VI

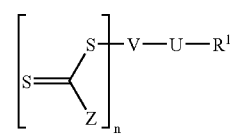
VIa when said chain transfer agent is of the formula II, wherein U is said solvophobic block and V is said solvophilic block.

11. The process of claim 6 wherein said block copolymer is of the formula:

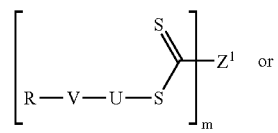
VII

-continued

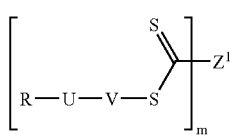

VIIa when said chain transfer agent is of the formula III, wherein U is said solvophobic block and V is said solvophilic block.

12. The process of claim 6 wherein said block copolymer is of the formula:

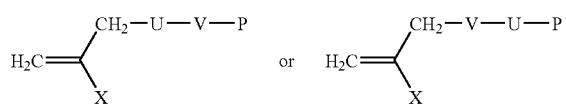

when said chain transfer agent is of the formula IV, wherein U is said solvophobic block and V is said solvophilic block.

13. The process of claim 6 wherein said block copolymer is of the formula:

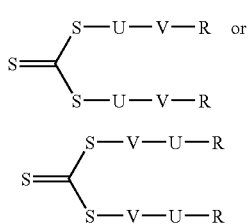

IX

IXa when said chain transfer agent is of the formula 1, wherein Z is —SR, U is said solvophobic block ad V is said solvophilic block.

14. The process of claim 9, 10, 11, 12 or 13, wherein:
when said U is poly(butyl methacrylate-co-allyl methacrylate)-block-poly(butyl methacrylate) said V is poly(methacrylic acid);
when said U is poly(hydroxyethyl methacrylate-co-2-ethylhexyl methacrylate-co-isobutyl methacrylate), said V is poly(acrylic acid-co-methyl methacrylate-co-methylacrylate-co-styrene); or
when said U is poly(hydroxyethyl methacrylate-co-2-ethylhexyl methacrylate-co-isobutyl methacrylate), said V is poly(glycidyl methacrylate-co-methyl methacrylate-co-methyl acrylate-co-styrene).

15. The process of claim 14 wherein at least one of U or V is formed from a monomer mixture comprising allyl methacrylate monomer.

16. The process of claim 14 wherein at least one of U or V is formed from a monomer mixture comprising glycidyl methacrylate monomer.

17. The process of claim 4 wherein said solvophobic block includes a polymerizable group.

18. The process of claim 17 wherein said step of crosslinking comprises adding a free radical initiator and a monomer.

19. The process of claim 18 wherein said polymerizable group is allyl and said monomer is methyl methacrylate or styrene.

20. The process of claim 5 wherein said solvophobic block includes a polymerizable group.

21. The process of claim 20 wherein said step of chain extending comprises adding a free radical initiator and a monomer.

22. The process of claim 21 wherein said polymerizable group is allyl and said monomer is methyl methacrylate or styrene.

23. The process of claim 4 wherein said epoxide results from adding glycidyl (meth)acrylate in said (i) step.

24. The process of claim 4 wherein said (iii) comprises adding trimellitic anhydride.

25. The process of claim 4 wherein said (iii) comprises adding polyepoxide when said crosslinkable functionality is said carboxylic.

26. The process of claim 25 wherein said carboxylic results from adding (meth)acrylic acid in said (i) step.

27. The process of claim 1 wherein said solvophobic block of said block copolymer is provided with one or more crosslinkable functionalities.

28. The process of claim 27 wherein said step (iii) comprises crosslinking said crosslinkable functionalities.

29. The process of claim 28 wherein said dispersing medium comprises in the range of 0.1 weight percent to 70 weight percent of said microgel.

30. The process of claim 1 wherein said solvophilic block of said block copolymer is provided with one or more crosslinkable functionalities.

31. The process of claim 30 wherein said step (iii) comprises crosslinking said crosslinkable functionalities.

32. The process of claim 31 wherein said dispersing medium comprises in the range of 0.001 weight percent to 10 weight percent of said microgel.

33. A microgel containing one or more of the following functionalities:

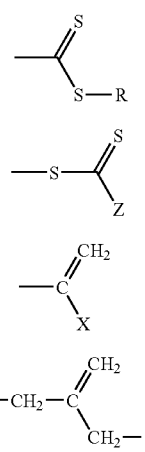

XI

XII

XIII

XIV wherein R and P are free radical leaving groups; and wherein,
R is selected from the group consisting of unsubstituted or substituted $C_1$ to $C_{18}$ alkyl, unsubstituted or substituted alkenyl, unsubstituted or substituted alkynyl, unsubstituted or substituted saturated carbocyclic ring, unsubstituted or substituted unsaturated carbocyclic ring, unsubstituted or substituted aromatic carbocyclic ring, unsubstituted or substituted saturated heterocyclic ring, unsubstituted or substituted unsaturated heterocyclic ring, unsubstituted or substituted aromatic heterocyclic ring, unsubstituted or substituted alkylthio group, and a first polymer chain having a number average degree of polymerization in the range of 5 to 1000;

Z is selected from the group consisting of hydrogen, chlorine, unsubstituted or substituted $C_1$ to $C_{18}$ alkyl, unsubstituted or substituted aryl, unsubstituted or substituted $C_3$ to $C_{18}$ heterocyclic ring, unsubstituted or substituted $C_1$ to $C_{18}$ alkylthio, SR, unsubstituted or substituted arylthio, unsubstituted or substituted $C_1$ to $C_{18}$ alkoxy, unsubstituted or substituted aryloxy, unsubstituted or substituted amino, unsubstituted or substituted $C_1$ to $C_{18}$ alkoxycarbonyl, unsubstituted or substituted aryloxycarbonyl, carboxy, unsubstituted or substituted $C_1$ to $C_{18}$ acyloxy, unsubstituted or substituted aroyloxy, unsubstituted or substituted carbamoyl, cyano, $C_2$ to $C_{18}$ dialkyl-phosphonato, diaryl-phosphonato, $C_1$ to $C_{18}$ dialkyl-phosphinato, diaryl-phosphinato and a second polymer chain having a number average degree of polymerization in the range of 5 to 1000;

P is an oligomer or polymer having a number average degree of polymerization in the range of 2 to 1000 or said first polymer chain;

X is selected from the group consisting of unsubstituted or substituted aryl, $C_1$ to $C_{18}$ alkoxycarbonyl, unsubstituted or substituted aryloxycarboyl, carboxy, unsubstituted or substituted aryloxycarbonyl, $C_1$ to $C_{18}$ carboxy, and cyano; and wherein the substituents for the substituted groups for R, Z and X are independently selected from the group consisting of hydroxy, tertiary amino, halogen, cyano, epoxy, carboxylic acid, alkoxy, alkyl having 1 to 32 carbon atoms, aryl, alkenyl having 2 to 32 carbon atoms, alkynyl having from 2 to 32 carbon atoms, saturated carbocyclic rings having 3 to 14 carbon atoms, unsaturated carbocyclic rings having 4 to 14 carbon atoms, aromatic carbocyclic rings having 6 to 14 carbon atoms, saturated heterocyclic rings having 3 to 14 carbon atoms, unsaturated heterocyclic rings having 3 to 14 carbon atoms and aromatic carbocyclic rings having 6 to 14 carbon atoms.

34. A microgel of claim 33 stabilized by crosslinking, wherein the crosslinking functionality is allyl.

35. A microgel of claim 33 stabilized by crosslinking, wherein the crosslinking functionality is epoxy.

36. A microgel when produced by the process of claim 1.

37. The microgel of claim 36 wherein said microgel has a particle size in the range of 10 nm to 1000 nm.

38. The microgel of claim 36 wherein said microgel has a particle size in the range of 20 nm to 100 nm.

39. The process of claim 1 further comprising:
adding in said step (ii) a material to be encapsulated; and
encapsulating said material in said microgel.

40. The process of claim 39 wherein said material is partially solubilized, solubilized, or suspended in a carrier medium.

41. The process of claim 39 further comprising separating said microgel from said dispersing medium by destabilizing said microgel.

42. The process of claim 39, 40, or 41 wherein said material is an organic molecule, dye molecule, organic pigment, inorganic pigment, catalyst, aluminum flake, talc flake, fiber, foam, toxic molecule, biocide, herbicide, insecticide, pharmaceutical drug molecule, bio-active material or genetic material.

43. A microgel encapsulating a material produced by the process of claim 39, 40, or 41.

44. A microgel as claimed in claim 43 wherein the material is a pharmaceutical or other bio-active substance.

45. A microgel as claimed in claim 43 wherein the material is a dye molecule.

46. The process of claim 1, 39 or 41 further comprising adding said microgel to a coating composition.

47. The process of claim 1, 38 or 41 further comprising adding said microgel to a molding compound to improve impact resistance.

48. The process of claim 47 wherein said molding compound is a thermoplastic resin or a thermosetting resin.

49. A coating composition when produced by the process claimed in claim 46.

50. A molded article when produced by the process claimed in claim 47 or 48.

* * * * *